(12) United States Patent
Umholtz

(10) Patent No.: US 7,181,860 B1
(45) Date of Patent: Feb. 27, 2007

(54) MITER MEASURING TAPE

(76) Inventor: Kurt Franklyn Umholtz, 1323 Olympia Ave., Mt. Dora, FL (US) 32757

( * ) Notice: Subject to any disclaimer, the term of this patent is extended or adjusted under 35 U.S.C. 154(b) by 0 days.

(21) Appl. No.: 11/268,185

(22) Filed: Nov. 5, 2005

(51) Int. Cl.
*G01B 3/10* (2006.01)

(52) U.S. Cl. .......................................... 33/758; 33/770
(58) Field of Classification Search ................. 33/484, 33/485, 758, 759, 760, 768, 770
See application file for complete search history.

(56) References Cited

U.S. PATENT DOCUMENTS

| | | | |
|---|---|---|---|
| 2,453,261 A | 11/1948 | Peters | |
| 2,770,042 A | 11/1956 | Hone | |
| 2,770,883 A * | 11/1956 | Hackney | 33/770 |
| 3,601,896 A * | 8/1971 | Ledene | 33/770 |
| 3,611,576 A * | 10/1971 | Quenot | 33/770 |
| 3,935,767 A | 2/1976 | McClay, Jr. | |
| 4,466,194 A * | 8/1984 | Rutty | 33/770 |
| 4,642,898 A | 2/1987 | Miller | |
| 5,077,910 A | 1/1992 | Smith | |
| 5,600,894 A * | 2/1997 | Blackman et al. | 33/758 |
| 6,101,734 A * | 8/2000 | Ten Caat et al. | 33/770 |
| 6,108,926 A * | 8/2000 | Fraser et al. | 33/768 |
| 6,115,931 A * | 9/2000 | Arcand | 33/755 |
| RE36,887 E * | 10/2000 | Goldman | 33/760 |
| 6,226,885 B1 | 5/2001 | Korich | |
| 6,415,519 B1 * | 7/2002 | Bennett | 33/770 |
| 2006/0053649 A1 * | 3/2006 | Greally | 33/758 |

FOREIGN PATENT DOCUMENTS

DE       3414342 A1 * 10/1985 ............... 33/758

* cited by examiner

*Primary Examiner*—G. Bradley Bennett
(74) *Attorney, Agent, or Firm*—Robert W. Harris

(57) ABSTRACT

A miter measuring tape, for allowing a workman to readily and quickly measure a section of window or door frame casing stock from the inside point of a miter cut end of said stock section, having a tape measure with a hooking member of adjustable and fixable length pivotally connected to one end of said tape measure at the proximal end of said hooking member, with said hooking member having a hook at the distal end of said hooking member, said hook being used to secure the miter measuring tape to the outside point of said miter cut end of said stock section.

18 Claims, 2 Drawing Sheets

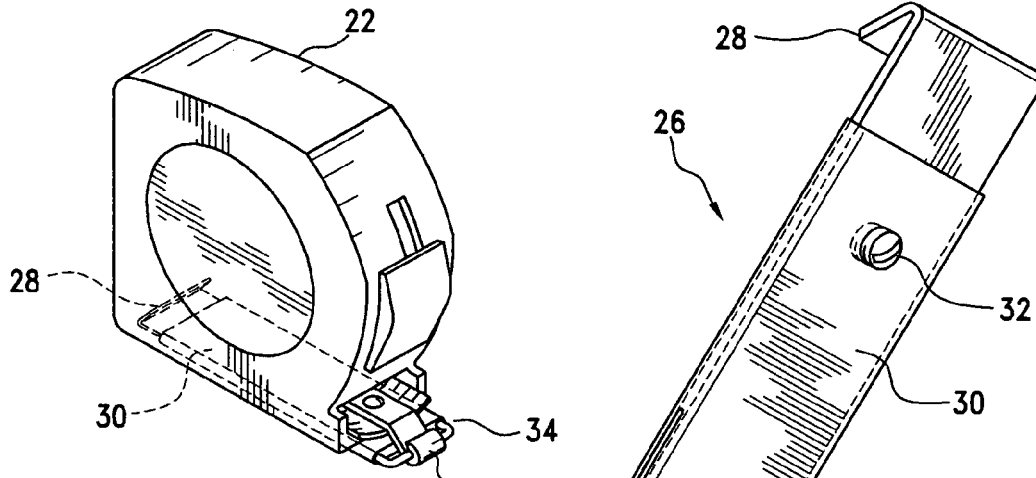
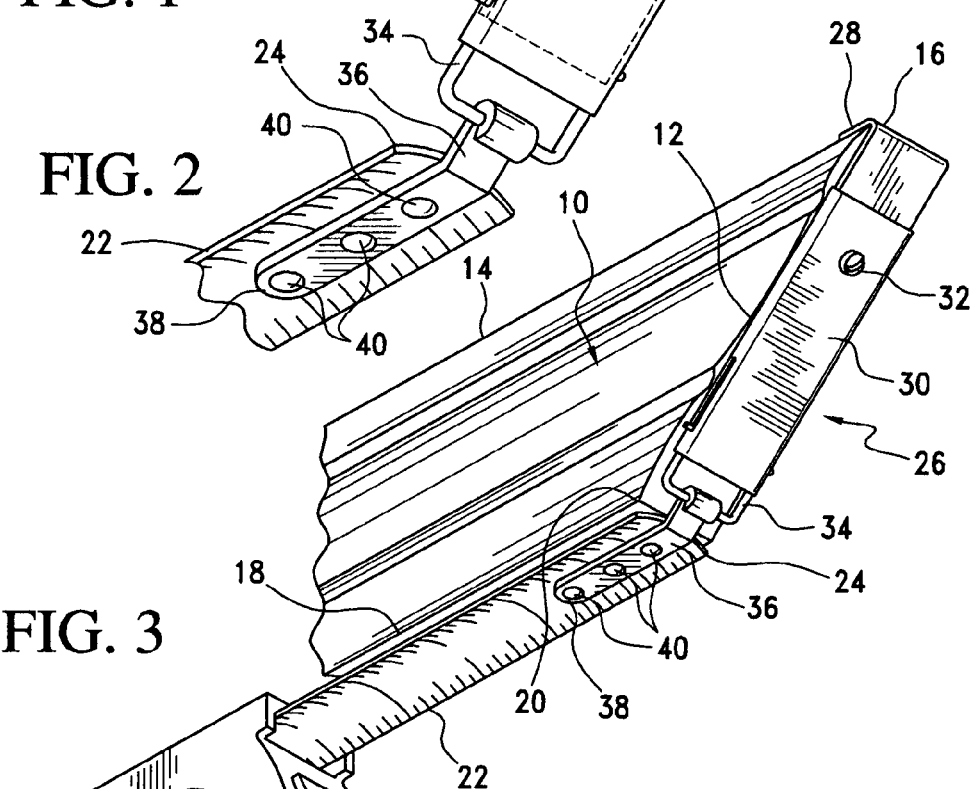
FIG. 1
FIG. 2
FIG. 3

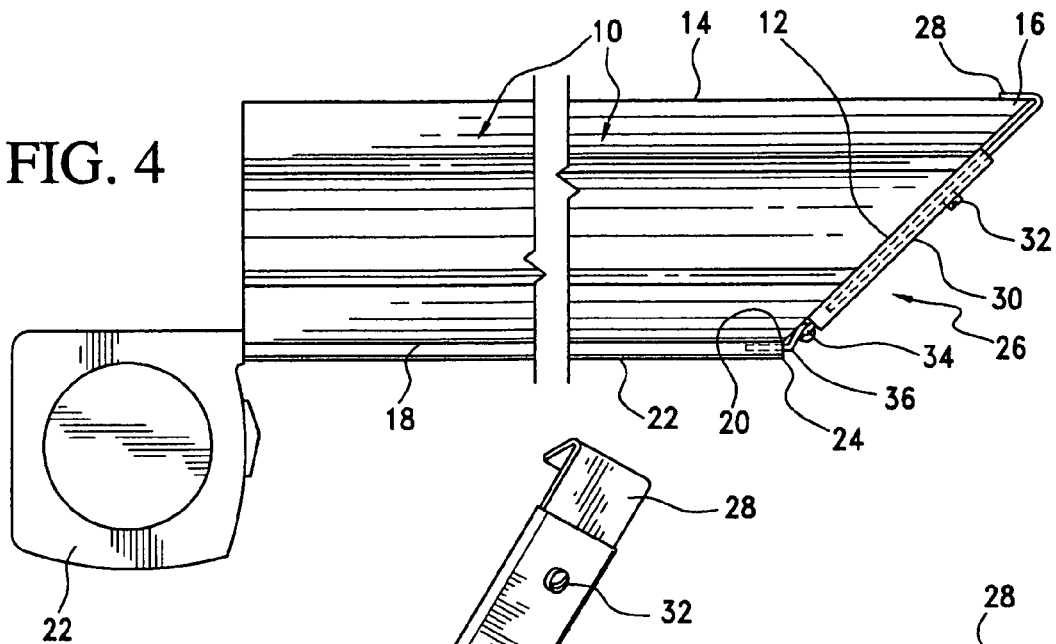
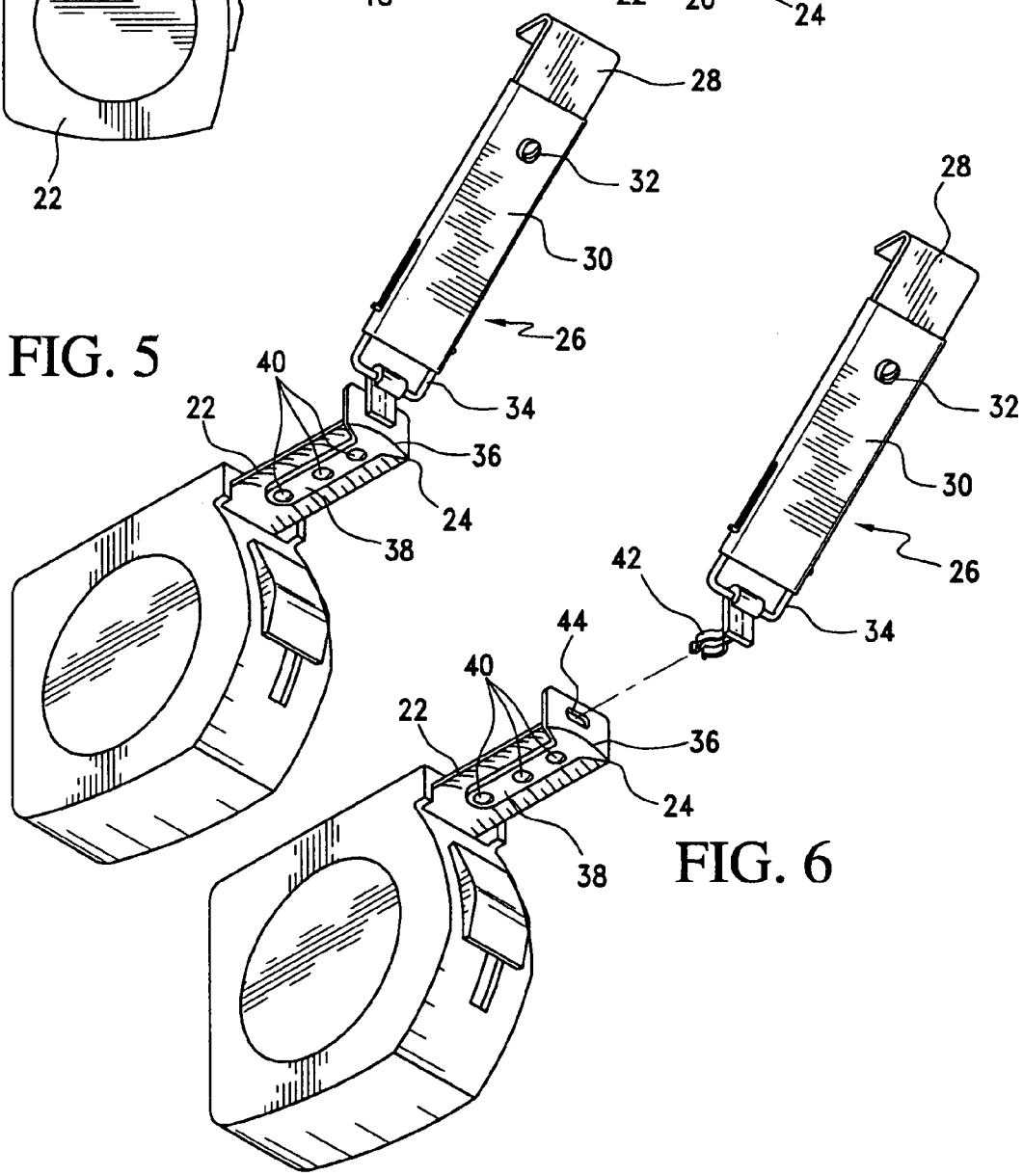

MITER MEASURING TAPE

BACKGROUND OF THE INVENTION

The present invention pertains generally to carpentry measurement devices, more specifically to measurement of interior frame casing stock sections used in window frames and door frames, and in particular allows improved speed and accuracy of such measurement in cases where the stock has mitered ends, typically with 45 degree angles of the end edge of each stock section.

For measurement and cutting of framing material for a window or door of given desired dimensions, where each section of frame casing is to have mitered ends, so that each finished framing section has a longer outer length and a shorter inner length, the inner shorter length of each section of frame casing will equal a given desired dimension of the window or door opening. So there is a need to accurately and quickly measure the inner shorter length of a piece of frame casing stock, to make it equal to the corresponding desired window or door aperture dimension.

Current carpentry measurement devices known to applicant do not allow a workman to quickly attach an end of a tape measure at the end point of the inner length of a frame casing stock section, at a mitered end of the section. So after cutting a mitered end, the workman needs to manually align the tape measure end at that inner length end point, then stretch the tape measure out to the desired inner framing section length, lock the tape measure, and mark the other end, in order to measure the needed inner length of the section. This procedure is slow and causes inaccuracy particularly in measuring long pieces of stock.

The present invention deals with these problems by the general approach of providing a hooking member, pivotally attached to one end of the tape measure, with the hooking member having a hook at the outer end which the workman readily hooks to the outer point of the typically 45 degree mitered end which has previously been cut by the workman in one end of a framing casing stock section, and with the hooking member having a length equal to the length of the mitered end of the stock section, so that the end of the tape measure is automatically aligned at the end point of the inner length of the framing stock section. The hooking member may be adjustable to various fixed lengths for use with framing stock of varying size, or of fixed length for use with stock of a particular size.

It is not the intent of this application, by stating that certain embodiments of the present invention are suited to certain purposes or to dealing with certain problems, to necessarily limit the scope of the invention to only embodiments which are useful for said purposes or problems; it is instead the intent that the scope of the invention be determined by the claims as more fully stated below.

SUMMARY OF THE INVENTION

As a summary, this section of course does not explicate the invention in all the detail of the subsequent detailed description and claims. It is intended that the relative brevity of this summary shall not limit the scope of the invention, which scope is to be determined by the claims, properly construed, including all subject matter encompassed by the doctrine of equivalents as properly applied to the claims.

In one broad aspect the invention is a miter measuring tape, for allowing a workman to readily and quickly measure a section of interior frame casing stock which may for example be frame casing stock used in window frames, from an inside point of a miter cut end of said stock section, said section end also having an outside point, comprising: a tape measure; and a hooking member of adjustable and fixable length, pivotally connected to one end of said tape measure at a proximal end of said hooking member, with said hooking member having a hook at a distal end of said hooking member, opposite said proximal end, said hook of a form allowing said workman to secure said miter measuring tape to said outside point of said end of said stock section.

BRIEF DESCRIPTION OF THE DRAWINGS

In the drawings, in which FIGS. 1–4 depict the same embodiment, and FIGS. 5 and 6 both depict an alternate embodiment, FIG. 1 is a perspective view of the invention in an initial, stored configuration.

FIG. 2 is an enlarged perspective view of the end of the tape measure and the hooking member unfolded into a typical orientation for measurement of a framing stock section.

FIG. 3 is a perspective view of the invention aligned at one end of a framing stock section, in use of the invention.

FIG. 4 is an elevational view of the invention in use in measurement of a framing stock section.

FIG. 5 is a perspective view of an alternate embodiment in which the hooking member is detachable from the end of the tape measure.

FIG. 6. is an exploded perspective view of the embodiment shown in FIG. 5.

DETAILED DESCRIPTION

Those familiar with the art will understand that the invention may be employed in varied embodiments, for various specific purposes, without departing from the essential substance thereof. The description of any one embodiment given below is intended to illustrate an example rather than to limit the invention. This section is not intended to indicate that any one embodiment is necessarily generally preferred over any other one for all purposes, or to limit the scope of the invention by describing any such embodiment, which invention scope is intended to be determined by the claims, properly construed, including all subject matter encompassed by the doctrine of equivalents as properly applied to the claims.

Referring now to the drawings, in which like reference numbers denote like or corresponding elements, a workman desires to measure a framing stock section 10 from a miter cut end 12 thereof which the workman has already cut. When miter cut at both ends, the stock section 10 will have a longer outer side 14, ending in an outer point 16, and a shorter inner side 18, ending at the miter cut inner point 20.

The workman needs to measure the stock section 10 so that, when miter cut at both ends, the length of inner side 18 will equal the desired window or door aperture dimension. The problem is that there is nothing at the inner point 20 of the miter cut end 12 of stock section 10, to which to hook the tape measure 22 so that the zero length end 24 of tape measure 22 will be fixed exactly at inner point 20, the point from which measurement is to be made.

The present invention allows the workman to easily avoid this problem, using the hooking member 26, pivotally connected to tape measure 22 at a proximal end of hooking member 26, and having a hook 28 at the opposite, distal end of hooking member 26. As detailed below, the workman may adjust and fix the length of hooking member 26 to be equal to the length of miter cut end 12 of stock section 10. Then, simply by hooking hook 28 to the outer point 16 of stock section 10, and grasping tape measure 22 and pulling hooking member 26 down along miter cut end 12 of stock section 10, and then pulling tape measure 22 taught along inner side 18 of stock section 10, the tape measure 22 will automatically be aligned with its zero length end 24 located at inner point 20 of the miter cut.

In a typical operation the workman will be doing equal angle miter cuts on multiple stock pieces of the same width, and will only need to adjust the length of hooking member 26 once at the beginning of mitering operations for all pieces of stock sections 10 of the same width. Then he can readjust the hooking member length before switching to framing stock of a different size.

In one embodiment of the invention, the length of the hooking member 26 is readily adjustable to a suitable fixed length by means of having the hooking member 26 formed of two slidably engaged sections 30, which may be slid relative to one another in a direction parallel to a long axis of the member, and a set screw 32, threaded through one of the sections 30, and pressing against the other of the sections 30. One of the sections 30 may be an outer housing, and the other of the sections 30 may slide within said outer housing.

The pivotal connection of the hooking member 26 and the tape measure 22 may be accomplished in a variety of specific forms. For example, and not by way of limitation, a wire type hinge pin 34 may be used to allow pivoting motion of hooking member 26, with hinge pin 34 having a hinge-to-tape connector 36, with a base 38, secured to tape measure 22 by means of screws 40, though rivets could of course be used instead of screws 40.

Some Possible Variations of Embodiments

Those familiar with the art will understand that various embodiments of the invention may usefully be employed for various purposes. The variations described below are by way of example, and are not intended to limit the scope of the invention.

For example, the invention may be fabricated using a variety of materials, since no great mechanical strength is required. A variety of metals, plastics or wire type construction may be used.

Although the invention will perhaps most often be employed in a form allowing adjustment of the length of hooking member 26, for use with framing stock of varying width, the invention could of course be of a form in which hooking member 26 is of fixed length, for use with framing stock of only one width and for only one desired miter cut angle. This form of the invention might be made of cloth, except for the hook 28, which would be of metal or plastic.

Although the hooking member 26 may be attached to tape measure 22 in the manner already described, alternate means of attachment might be used instead. For example, a spring clip 42 might be used to secure hooking member 26 to a slot 44 in the connector 36 of an existing tape measure, as best seen in FIG. 6.

Similarly no particular form of set screw 32 need be used in fixing the length of the hooking member 26: One may employ friction grip or wing nut hand-tightened screws, or allen key type screws, for example.

Though the most common use of the invention will likely be in connection with miter cuts inclined at a 45 degree angle with respect to the framing stock, i.e. the angle between the outer side 14 and the miter cut end 12 of stock section 10, as best seen in FIG. 4, there is of course nothing to preclude use of the invention in connection with making miter cuts of other angular orientations. For framing stock of a given width, the needed length of hooking member 26 will of course need to be suitably adjusted if the miter cut angle is changed from 45 degrees to some other angle, so that the length of hooking member 26 will equal the different length of the differently-angled miter cut end 12 of stock section 10.

For whatever framing stock width and miter cut angle may be involved, the workman will be able to simply adjust the length of hooking member 26 to correspond to the length of miter cut end 12, and fix it at that length, for all adjustable hooking member embodiments, and will have no need to do any calculation taking into account the length of miter cut end 12, as would be necessary if the zero length end 24 of tape measure 22 were to be hooked directly to stock section 10 at outer point 16 of the miter cut.

The invention claimed is:

1. A miter measuring tape, for allowing a workman to readily and quickly measure a section of interior frame casing stock which may be frame casing stock used in window frames, from an inside point of a miter cut end of said stock section, said section end also having an outside point, comprising:
    (a) a tape measure; and
    (b) a hooking member of adjustable and fixable length, pivotally connected to one end of said tape measure at a proximal end of said hooking member, with said hooking member having a hook at a distal end of said hooking member, opposite said proximal end, said hook of a form allowing said workman to secure said miter measuring tape to said outside point of said miter cut end of said stock section.

2. Miter measuring tape of claim 1, wherein said hook comprises a hook portion of said hooking member at said distal end of said hooking member, said hook portion being bent in an acute angle with respect to the remaining, main portion of said hooking member.

3. Miter measuring tape of claim 1, wherein said hooking member has a principal longitudinal axis and wherein said hooking member comprises a plurality of sections slidably engaged with one another so as to allow said sections to be slid with respect to one another in a direction at least substantially parallel to said principal longitudinal axis of said hooking member, said hooking member further comprising a fixation means, connected to each of said sections of said hooking member, for fixing said sections in desired relative positions of said sections.

4. Miter measuring tape of claim 3, wherein said hooking member has two of said sections, and wherein said fixation means comprises a set screw engaging each of said sections.

5. Miter measuring tape of claim 1, wherein said hooking member is pivotally connected to said tape measure by a wire hinge pin, and wherein said hinge pin has a base which is screwed to said tape measure by a plurality of screws.

6. Miter measuring tape of claim 2, wherein said acute angle is at least substantially equal to 45 degrees.

7. Miter measuring tape of claim 1, wherein said miter measuring tape is composed of metal.

8. Miter measuring tape of claim 1, wherein said miter measuring tape is composed of plastic.

9. Miter measuring tape of claim 1, further comprising means to readily detach said hooking member from said tape measure and to readily reattach said hooking member to said tape measure.

10. Miter measuring tape of claim 1, wherein said hooking member is pivotally connected to said tape measure by a wire hinge pin, and wherein said hinge pin has a base which is secured to said tape measure by a plurality of rivets.

11. A miter measuring tape, for allowing a workman to readily and quickly measure a section of interior frame casing stock which may be frame casing stock used in window frames, from an inside point of a miter cut end of said stock section, said miter cut end also having an outside point, comprising:
   (a) a tape measure;
   (b) a hooking member connected to one end of said tape measure at a proximal end of said hooking member, with said hooking member having a hook at a distal end of said hooking member, opposite said proximal end, said hook of a form allowing said workman to secure said miter measuring tape to said outside point of said miter cut end of said stock section, said hooking member further comprising a length adjustment and fixation means, for allowing adjustment of the length of said hooking member and for allowing said length to be fixed at a desired length; and
   (c) a pivoting means, connected to said tape measure and said hooking member, for allowing said hooking member to be pivoted with respect to said tape measure.

12. Miter measuring tape of claim 11, wherein said hooking member has a principal longitudinal axis and wherein said length adjustment and fixation means comprises two sections of said hooking member slidably engaged together for relative motion of said sections in a direction at least substantially parallel to said principal longitudinal axis, and a set screw, engaging each of said sections of said hooking member.

13. Miter measuring tape of claim 11, wherein said pivoting means comprises a wire hinge pin attached to said hooking member, and wherein said hinge pin has a base which is screwed to said tape measure by a plurality of screws.

14. Miter measuring tape of claim 11, wherein said hook comprises a hook portion of said hooking member at said distal end of said hooking member, said hook portion being bent in an acute angle with respect to the remaining, main portion of said hooking member.

15. Miter measuring tape of claim 14, wherein said acute angle is at least substantially equal to 45 degrees.

16. Miter measuring tape of claim 11, wherein said miter measuring tape is composed of metal.

17. Miter measuring tape of claim 11, wherein said miter measuring tape is composed of plastic.

18. Miter measuring tape of claim 13, wherein said base further comprises a lower base portion screwed to said tape measure by said plurality of screws, and an upwardly extending portion of said lower base portion, extending upwardly at an angle from the lower portion of said lower base portion, said upwardly extending portion having a slot therein; and an upper base portion, having a spring clip securely attached to said upper base portion, said spring clip being sized to firmly engage said slot in said upwardly extending portion of said lower base portion of said base, when said spring clip is firmly pushed into said slot.

* * * * *